(12) United States Patent
Liu et al.

(10) Patent No.: US 9,868,862 B2
(45) Date of Patent: Jan. 16, 2018

(54) SURFACE COATING SYSTEM AND METHOD OF USING SURFACE COATING SYSTEM

(75) Inventors: Jia Liu, Lake Villa, IL (US); Christopher C. Cypcar, Hudson, OH (US)

(73) Assignee: Diversey, Inc., Charlotte, SC (US)

( * ) Notice: Subject to any disclaimer, the term of this patent is extended or adjusted under 35 U.S.C. 154(b) by 13 days.

(21) Appl. No.: 14/119,999

(22) PCT Filed: May 25, 2012

(86) PCT No.: PCT/US2012/039648
§ 371 (c)(1),
(2), (4) Date: Nov. 25, 2013

(87) PCT Pub. No.: WO2012/162640
PCT Pub. Date: Nov. 29, 2012

(65) Prior Publication Data
US 2014/0087070 A1    Mar. 27, 2014

Related U.S. Application Data

(60) Provisional application No. 61/489,975, filed on May 25, 2011.

(51) Int. Cl.
| | | |
|---|---|---|
| C09D 5/20 | (2006.01) |
| C09J 7/02 | (2006.01) |
| C09D 175/04 | (2006.01) |
| C09J 175/04 | (2006.01) |
| C09D 7/12 | (2006.01) |
| B05D 1/36 | (2006.01) |
| B05D 3/02 | (2006.01) |
| B05D 7/00 | (2006.01) |
| B32B 7/06 | (2006.01) |
| B32B 27/00 | (2006.01) |
| B32B 27/40 | (2006.01) |
| C08G 18/08 | (2006.01) |

(52) U.S. Cl.
CPC ............... *C09D 5/20* (2013.01); *B05D 1/36* (2013.01); *B05D 3/02* (2013.01); *B05D 7/51* (2013.01); *B05D 7/52* (2013.01); *B32B 7/06* (2013.01); *B32B 27/00* (2013.01); *B32B 27/40* (2013.01); *C08G 18/0819* (2013.01); *C09J 7/0242* (2013.01); *C09J 175/04* (2013.01); *B05D 2508/00* (2013.01); *B32B 2250/02* (2013.01); *B32B 2375/00* (2013.01); *C08G 2170/80* (2013.01); *C09J 2475/00* (2013.01); *C09J 2475/006* (2013.01)

(58) Field of Classification Search
None
See application file for complete search history.

(56) References Cited

U.S. PATENT DOCUMENTS

| | | |
|---|---|---|
| 2,655,976 A | 10/1953 | Lovin |
| 2,956,904 A | 10/1960 | Hendricks |
| 2,979,756 A | 4/1961 | Wallis |
| 3,008,850 A | 11/1961 | Ulrich |
| 3,457,015 A | 7/1969 | Taber |
| 3,600,268 A | 8/1971 | Hori et al. |
| 3,619,335 A | 11/1971 | Bryan |
| 3,620,796 A | 11/1971 | Gordy |
| 3,642,564 A | 2/1972 | Walker et al. |
| 3,922,464 A | 11/1975 | Silver et al. |
| 3,981,596 A | 9/1976 | Melton |
| 4,024,312 A | 5/1977 | Korpman |
| 4,082,830 A | 4/1978 | Cogliano |
| 4,115,617 A | 9/1978 | Mitsuishi et al. |
| 4,124,315 A | 11/1978 | Melton |
| 4,151,319 A | 4/1979 | Sackoff et al. |
| 4,181,752 A | 1/1980 | Martens et al. |
| 4,189,419 A | 2/1980 | Takemoto et al. |
| 4,189,519 A | 2/1980 | Ticknor |
| 4,200,671 A | 4/1980 | Krajewski et al. |

(Continued)

FOREIGN PATENT DOCUMENTS

| | | |
|---|---|---|
| CN | 1726131 | 12/2002 |
| CN | 101410349 | 4/2009 |
| EP | 109177 | 5/1984 |
| EP | 352079 | 1/1990 |
| EP | 0237784 | 6/1991 |
| EP | 527505 | 2/1998 |
| EP | 911463 | 4/1999 |
| EP | 918079 | 5/1999 |
| EP | 569921 | 1/2000 |
| EP | 1234928 | 8/2002 |

(Continued)

OTHER PUBLICATIONS

United States Patent Office Action for U.S. Appl. No. 13/512,078 dated Mar. 3, 2014 (10 pages).
Chinese Patent Office Action for Application No. 201080053508.8 dated Feb. 28, 2014 (28 pages, with English translation).
Korean Patent Office Action for Application No. 10-2009-7026212 dated Mar. 31, 2014 (4 pages).

(Continued)

*Primary Examiner* — William Phillip Fletcher, III

(57) ABSTRACT

A coating system for a surface (such as a floor) including a liquid adhesive layer composition including a heat-activated adhesive that forms an adhesive layer upon drying after application to a surface, and a liquid maintenance layer composition comprising a dispersible polymer that forms a maintenance layer upon drying after application to the adhesive layer. The adhesive layer and the maintenance layer may form a peelable coating. An adhesive strength between the adhesive layer and the maintenance layer may be greater than an adhesive strength between the adhesive layer and the surface. The peelable coating may have a tensile strength that is greater than the adhesive strength between the adhesive layer and the surface. The peelable coating may be configured to be peeled from the surface without the adhesive layer and the maintenance layer separating from one another.

20 Claims, 9 Drawing Sheets

(56) References Cited

U.S. PATENT DOCUMENTS

| | | | |
|---|---|---|---|
| 4,226,784 A | 10/1980 | Kalopissis et al. | |
| 4,327,121 A | 4/1982 | Gray, III | |
| 4,330,353 A | 5/1982 | Kunimoto et al. | |
| 4,341,687 A | 7/1982 | Ozeki et al. | |
| 4,363,145 A | 12/1982 | Kawesch | |
| 4,384,096 A | 5/1983 | Sonnabend | |
| 4,394,052 A | 7/1983 | Adams et al. | |
| 4,405,668 A | 9/1983 | Wald | |
| 4,407,875 A | 10/1983 | Schlegel et al. | |
| 4,440,830 A | 4/1984 | Wempe | |
| 4,445,959 A | 5/1984 | Hombach et al. | |
| 4,543,765 A | 10/1985 | Barrett | |
| 4,548,967 A | 10/1985 | Brown et al. | |
| 4,590,097 A | 5/1986 | Booth et al. | |
| 4,680,237 A | 7/1987 | Kenney et al. | |
| 4,681,784 A | 7/1987 | Ebara et al. | |
| 4,683,657 A | 8/1987 | Anderson et al. | |
| 4,701,480 A | 10/1987 | Markusch et al. | |
| 4,748,049 A | 5/1988 | Charles et al. | |
| 4,759,984 A | 7/1988 | Hwo | |
| 4,801,397 A | 1/1989 | Flanagan et al. | |
| 4,886,704 A | 12/1989 | Kamada et al. | |
| 4,894,259 A | 1/1990 | Kuller | |
| 4,937,033 A | 6/1990 | Oshio et al. | |
| 4,937,139 A | 6/1990 | Genske et al. | |
| 4,948,451 A | 8/1990 | Foltz | |
| 5,009,944 A | 4/1991 | Maruyama et al. | |
| 5,043,198 A | 8/1991 | Maruyama et al. | |
| 5,116,439 A | 5/1992 | Raus | |
| 5,143,949 A | 9/1992 | Grogan et al. | |
| 5,198,299 A | 3/1993 | Kato et al. | |
| 5,236,991 A | 8/1993 | Makati et al. | |
| 5,286,781 A | 2/1994 | Gotoh et al. | |
| 5,319,053 A | 6/1994 | Slack et al. | |
| 5,326,625 A | 7/1994 | Schuhmann et al. | |
| 5,330,788 A | 7/1994 | Roberts | |
| 5,342,872 A | 8/1994 | Huber | |
| 5,399,618 A | 3/1995 | Jenkins et al. | |
| 5,401,548 A | 3/1995 | Stepanek | |
| 5,411,760 A | 5/1995 | Woodhall et al. | |
| 5,431,962 A | 7/1995 | Glass et al. | |
| 5,444,108 A | 8/1995 | Hagquist et al. | |
| 5,449,539 A | 9/1995 | Stepanek | |
| 5,455,293 A | 10/1995 | Wood et al. | |
| 5,459,174 A | 10/1995 | Merrill et al. | |
| 5,494,702 A | 2/1996 | Blaine et al. | |
| 5,500,265 A | 3/1996 | Ambroise et al. | |
| 5,521,246 A | 5/1996 | Tien et al. | |
| 5,582,675 A | 12/1996 | Stepanek | |
| 5,589,013 A | 12/1996 | Stepanek | |
| 5,609,933 A | 3/1997 | Stepanek | |
| 5,609,954 A | 3/1997 | Aizawa et al. | |
| 5,610,260 A | 3/1997 | Schmalstieg et al. | |
| 5,618,582 A | 4/1997 | VanWinckel | |
| 5,631,312 A | 5/1997 | Takada et al. | |
| 5,652,288 A | 7/1997 | Wood et al. | |
| 5,672,402 A | 9/1997 | Kreckel et al. | |
| 5,716,667 A | 2/1998 | Kashiwada et al. | |
| 5,720,844 A | 2/1998 | Hanson | |
| 5,721,302 A | 2/1998 | Wood et al. | |
| 5,759,705 A | 6/1998 | Sinko | |
| 5,773,091 A | 6/1998 | Perlman et al. | |
| 5,786,092 A | 7/1998 | Lorenzo et al. | |
| 5,804,647 A | 9/1998 | Nachtkamp et al. | |
| 5,849,384 A | 12/1998 | Stepanek | |
| 5,851,618 A * | 12/1998 | Liddell et al. | 428/41.8 |
| 5,905,113 A | 5/1999 | Licht et al. | |
| 5,945,462 A | 8/1999 | Salamon | |
| 5,945,468 A | 8/1999 | Atkinson et al. | |
| 5,949,462 A | 9/1999 | Esplin et al. | |
| 5,965,195 A | 10/1999 | Muller et al. | |
| 5,997,968 A | 12/1999 | Dries et al. | |
| 6,017,163 A | 1/2000 | Keppers et al. | |
| 6,048,431 A | 4/2000 | Clements et al. | |
| 6,071,621 A | 6/2000 | Falaas et al. | |
| 6,083,335 A | 7/2000 | Scullin et al. | |
| 6,093,464 A | 7/2000 | Tokunaga et al. | |
| 6,096,383 A | 8/2000 | Berg et al. | |
| 6,124,004 A | 9/2000 | Furuta et al. | |
| 6,124,044 A | 9/2000 | Swidler | |
| 6,149,970 A | 11/2000 | Frigge et al. | |
| 6,172,126 B1 | 1/2001 | Muller et al. | |
| 6,191,216 B1 | 2/2001 | Ganster et al. | |
| 6,207,272 B1 | 3/2001 | Takahira et al. | |
| 6,211,282 B1 | 4/2001 | Yamashita et al. | |
| 6,217,945 B1 | 4/2001 | Fowler | |
| 6,228,433 B1 | 5/2001 | Witt | |
| 6,248,415 B1 | 6/2001 | Pedain et al. | |
| 6,273,513 B1 | 8/2001 | Pope | |
| 6,343,981 B1 | 2/2002 | Buchanan | |
| 6,344,136 B1 | 2/2002 | Butler et al. | |
| 6,344,236 B2 | 2/2002 | Yamashita et al. | |
| 6,380,281 B1 | 4/2002 | Gooch et al. | |
| 6,414,087 B1 | 7/2002 | Hashemzadeh et al. | |
| 6,436,527 B1 | 8/2002 | Zimmermann | |
| 6,458,441 B1 | 10/2002 | Storch et al. | |
| 6,472,027 B1 | 10/2002 | Olson et al. | |
| 6,482,488 B1 | 11/2002 | Janssen et al. | |
| 6,482,885 B1 | 11/2002 | Muller et al. | |
| 6,541,553 B1 | 4/2003 | Erickson et al. | |
| 6,555,615 B2 | 4/2003 | Van Rheenen | |
| 6,558,795 B2 | 5/2003 | Olson et al. | |
| 6,590,034 B2 | 7/2003 | Wanic et al. | |
| 6,607,818 B1 | 8/2003 | Satz et al. | |
| 6,620,890 B1 | 9/2003 | Yamashita et al. | |
| 6,645,554 B1 | 11/2003 | LePage | |
| 6,713,522 B2 | 3/2004 | Zhang et al. | |
| 6,723,407 B2 | 4/2004 | Dollase et al. | |
| 6,743,520 B2 | 6/2004 | Street et al. | |
| 6,749,948 B2 | 6/2004 | Sperlich et al. | |
| 6,765,057 B1 | 7/2004 | Chirivella et al. | |
| 6,770,361 B2 | 8/2004 | Kong | |
| 6,800,353 B1 | 10/2004 | Anderson et al. | |
| 6,802,159 B1 | 10/2004 | Kotler | |
| 6,803,099 B1 | 10/2004 | Anspach | |
| 6,822,012 B1 | 11/2004 | Baumgart et al. | |
| 6,822,063 B2 | 11/2004 | Olson et al. | |
| 6,824,818 B2 | 11/2004 | McCoy et al. | |
| 6,827,237 B2 | 12/2004 | Yorn et al. | |
| 6,831,126 B2 | 12/2004 | Gertzmann et al. | |
| 6,838,143 B2 | 1/2005 | Staller et al. | |
| 6,845,790 B2 | 1/2005 | Blumenberg et al. | |
| 6,854,912 B2 | 2/2005 | Dyer et al. | |
| 6,855,403 B2 | 2/2005 | Tysak | |
| 6,866,235 B2 | 3/2005 | Zimmermann et al. | |
| 6,875,497 B2 | 4/2005 | Emery et al. | |
| 6,896,956 B2 | 5/2005 | Kong | |
| 6,903,156 B2 | 6/2005 | Muller et al. | |
| 6,905,100 B2 | 6/2005 | Franck et al. | |
| 6,908,654 B2 | 6/2005 | Ishikawa et al. | |
| 6,949,160 B2 | 9/2005 | Weiss et al. | |
| 6,949,297 B2 | 9/2005 | Yang et al. | |
| 6,964,989 B1 | 11/2005 | Fang et al. | |
| 6,991,851 B2 | 1/2006 | Krepski et al. | |
| 7,097,876 B2 | 8/2006 | Tojo et al. | |
| 7,122,235 B2 | 10/2006 | Bourdelais et al. | |
| 7,137,170 B2 | 11/2006 | Morey et al. | |
| 7,160,044 B2 | 1/2007 | Dyer et al. | |
| 7,228,668 B2 | 6/2007 | Gibney et al. | |
| 7,255,920 B2 | 8/2007 | Everaerts et al. | |
| 7,288,312 B2 | 10/2007 | Peiffer et al. | |
| 7,314,669 B2 | 1/2008 | Galloway | |
| 7,316,848 B2 | 1/2008 | Longmoore | |
| 7,323,239 B2 | 1/2008 | Vanderstappen et al. | |
| 7,361,402 B2 | 4/2008 | Johnson | |
| 7,374,815 B2 | 5/2008 | Okochi et al. | |
| 7,427,644 B2 | 9/2008 | Silvers et al. | |
| 7,494,708 B2 | 2/2009 | Everaerts et al. | |
| 7,897,002 B2 | 3/2011 | Bober et al. | |
| 8,053,065 B2 | 11/2011 | Ortmeier et al. | |
| 2001/0041238 A1 | 11/2001 | Staller et al. | |
| 2002/0028311 A1 * | 3/2002 | Coppens | C09J 5/06 428/40.1 |
| 2002/0028621 A1 | 3/2002 | Levitt et al. | |

(56) References Cited

U.S. PATENT DOCUMENTS

| | | |
|---|---|---|
| 2002/0059776 A1 | 5/2002 | Harvey |
| 2002/0146544 A1 | 10/2002 | Kronzer |
| 2003/0017322 A1 | 1/2003 | Kim |
| 2003/0019560 A1 | 1/2003 | Mabbutt |
| 2003/0027010 A1 | 2/2003 | Olson et al. |
| 2003/0055150 A1 | 3/2003 | Betremieux et al. |
| 2003/0072948 A1 | 4/2003 | Krepski et al. |
| 2003/0096075 A1 | 5/2003 | Dollase et al. |
| 2003/0152735 A1 | 8/2003 | Koike |
| 2003/0152766 A1 | 8/2003 | Vergo et al. |
| 2003/0186048 A1 | 10/2003 | Sieber et al. |
| 2003/0192638 A1 | 10/2003 | Yang et al. |
| 2003/0215621 A1 | 11/2003 | Bermel |
| 2003/0224195 A1 | 12/2003 | Tysak |
| 2003/0235672 A1* | 12/2003 | Manteufel ............... B32B 7/06 428/40.1 |
| 2004/0034146 A1 | 2/2004 | Gertzmann et al. |
| 2004/0044116 A1 | 3/2004 | Olson et al. |
| 2004/0054072 A1 | 3/2004 | Rogmann et al. |
| 2004/0096630 A1 | 5/2004 | Sakurai et al. |
| 2004/0102545 A1 | 5/2004 | Robeson et al. |
| 2004/0115457 A1 | 6/2004 | Kong |
| 2004/0115458 A1 | 6/2004 | Kong |
| 2004/0127594 A1 | 7/2004 | Yang et al. |
| 2004/0146706 A1 | 7/2004 | Kasai et al. |
| 2004/0151932 A1 | 8/2004 | Galloway |
| 2004/0170817 A1 | 9/2004 | Fox et al. |
| 2004/0191484 A1 | 9/2004 | Levitt et al. |
| 2004/0191505 A1 | 9/2004 | Levitt et al. |
| 2004/0191506 A1 | 9/2004 | Levitt et al. |
| 2004/0191507 A1 | 9/2004 | Levitt et al. |
| 2004/0202812 A1* | 10/2004 | Congard ............... B42D 5/027 428/40.1 |
| 2004/0213967 A1 | 10/2004 | Peiffer et al. |
| 2004/0261346 A1 | 12/2004 | Gibney et al. |
| 2005/0027024 A1 | 2/2005 | Zhang et al. |
| 2005/0015140 A1 | 7/2005 | Li et al. |
| 2005/0147812 A1 | 7/2005 | Malfait et al. |
| 2005/0153141 A1 | 7/2005 | Li et al. |
| 2005/0176321 A1 | 8/2005 | Crette et al. |
| 2005/0208282 A1 | 9/2005 | Wood, Jr. et al. |
| 2005/0252132 A1 | 11/2005 | Sieber et al. |
| 2005/0266194 A1 | 12/2005 | Peters |
| 2005/0276916 A1 | 12/2005 | Yang et al. |
| 2006/0062955 A1 | 3/2006 | Liu et al. |
| 2006/0156663 A1 | 7/2006 | Mao |
| 2006/0205865 A1 | 9/2006 | Kim et al. |
| 2006/0222814 A1 | 10/2006 | Takahashi et al. |
| 2007/0112126 A1 | 5/2007 | Warren |
| 2007/0116914 A1 | 5/2007 | Koike |
| 2007/0141328 A1* | 6/2007 | Kamiyama ............... B32B 3/30 428/343 |
| 2007/0221317 A1 | 9/2007 | Kronzer et al. |
| 2007/0222274 A1 | 9/2007 | Manners |
| 2007/0245929 A1 | 10/2007 | Asami et al. |
| 2008/0008895 A1 | 1/2008 | Garner et al. |
| 2008/0010930 A1 | 1/2008 | Mao |
| 2008/0019078 A1 | 1/2008 | Arimitsu et al. |
| 2008/0138558 A1 | 6/2008 | Hojabr et al. |
| 2008/0139732 A1 | 6/2008 | Grevers et al. |
| 2008/0139764 A1 | 6/2008 | Le et al. |
| 2008/0139836 A1 | 6/2008 | Le et al. |
| 2008/0160293 A1 | 7/2008 | Arimitsu et al. |
| 2008/0262152 A1 | 10/2008 | Koehler |
| 2009/0104453 A1* | 4/2009 | Burghardt .......... C08G 18/6212 428/423.3 |
| 2009/0130454 A1 | 5/2009 | Ogino et al. |
| 2010/0300613 A1* | 12/2010 | Stogbauer ............. C09J 7/0203 156/256 |
| 2010/0307532 A1 | 12/2010 | Kron et al. |
| 2010/0330372 A1 | 12/2010 | Ludtke |
| 2014/0087156 A1 | 3/2014 | Sarkis et al. |

FOREIGN PATENT DOCUMENTS

| | | |
|---|---|---|
| EP | 1249480 | 10/2002 |
| EP | 892124 | 4/2004 |
| EP | 878527 | 7/2004 |
| EP | 1072652 | 11/2005 |
| EP | 1607214 | 12/2005 |
| EP | 1724319 | 11/2006 |
| EP | 1724320 | 11/2006 |
| EP | 1201422 | 2/2007 |
| EP | 1391471 | 10/2007 |
| EP | 1921118 | 5/2008 |
| JP | 49126733 | 12/1974 |
| JP | 50028535 | 3/1975 |
| JP | 57044679 | 3/1982 |
| JP | 11-58584 | 6/1989 |
| JP | 6143496 | 5/1994 |
| JP | 9137087 | 3/1997 |
| JP | 11-199802 | 7/1999 |
| JP | 2000-129171 | 5/2000 |
| JP | 2000-198921 | 7/2000 |
| JP | 2001-254049 | 9/2001 |
| JP | 2001-302988 | 10/2001 |
| JP | 2002-129108 | 5/2002 |
| JP | 2002-188298 | 7/2002 |
| JP | 2002-528297 | 9/2002 |
| JP | 2003-129014 | 5/2003 |
| JP | 2003-531759 | 10/2003 |
| JP | 2004-025174 | 1/2004 |
| JP | 2004-502011 | 1/2004 |
| JP | 2004-231823 | 8/2004 |
| JP | 2005-207183 | 8/2005 |
| JP | 2007-056256 | 3/2007 |
| JP | 2008-179692 | 8/2008 |
| KR | 10-2001-0103623 | 11/2001 |
| WO | WO 92/03290 | 3/1992 |
| WO | WO 96/13547 | 5/1996 |
| WO | WO 97/15499 | 5/1997 |
| WO | WO 00/24575 | 5/2000 |
| WO | WO 01/83634 | 11/2001 |
| WO | WO 01/83878 | 11/2001 |
| WO | WO 02/24346 | 3/2002 |
| WO | WO 03/000819 | 1/2003 |
| WO | WO 2006/086295 | 8/2006 |
| WO | WO 2007/013582 | 2/2007 |
| WO | WO 2007/065804 | 6/2007 |
| WO | WO 2007/075771 | 7/2007 |
| WO | WO 2007/113077 | 10/2007 |
| WO | WO 2007/117952 | 10/2007 |
| WO | WO 2007/117952 A1 * | 10/2007 |
| WO | WO 2008/144535 | 11/2008 |
| WO | WO 2009/094542 | 7/2009 |
| WO | WO 2011/066404 | 6/2011 |
| WO | WO 2011/066413 | 6/2011 |

OTHER PUBLICATIONS

European Patent Office Action for Application No. 10833943.3 dated May 9, 2014 (3 pages).
Adhesive Raw Materials; Acronal LA 449 S; TI /Ed 1541 Apr. 2003 BASF.
DuPont, "DuPont™ Zonyl FSJ Fluorosurfactant," (2005) 2 pages.
Ludtke et al., Project Orange Peel, Technology Symposium, May 1, 2008.
Ultra-Trak Model 500 Owner's Manual (Mar. 4, 2005), pp. 1-10.
Two pages showing an advertisement of the KiaMotion II Kaivac Cleaning Systems dated Feb. 14, 2006.
Two pages showing an advertisement of the KiaMotion Kaivac Cleaning Systems dated Feb. 14, 2006.
One page of an advertisement showing the Hillyard Multi-Flo Automated Applicator, undated.
One page of an advertisement showing the Hillyard, The Cleaning Resource dated Feb. 14, 2006.
One page of a Newsletter showing the KiaMotion SUV Kiavac Cleaning Systems dated Feb. 14, 2006.
International Search Report and Written Opinion for Application No. PCT/US2008/063932 dated Dec. 8, 2008 (16 pages).

(56) References Cited

OTHER PUBLICATIONS

European Patent Office Extended Search Report for Application No. 08755731.0 dated Dec. 27, 2010 (4 pages).
International Search Report from Korean Patent Office for Application No. PCT/US2009/031839 dated Jul. 28, 2009 (3 pages).
The International Search Report prepared by the Korean Intellectual Property Office for Application No. PCT/US2010/058026 dated Aug. 18, 2011 (4 pages).
United States Patent Office Action for U.S. Appl. No. 12/600,441 dated Jan. 17, 2012 (16 pages).
United States Patent Office Action for U.S. Appl. No. 12/600,441 dated Aug. 3, 2012 (14 pages).
European Patent Office Action for Application No. 08755731.0 dated Sep. 26, 2013 (4 pages).
International Search Report and Written Opinion for Application No. PCT/US2010/058040 dated Aug. 22, 2011.
International Preliminary Report on Patentability for Application No. PCT/US2010/058040 dated Jun. 7, 2012 (7 pages).
European Patent Office Extended Search Report for Application No. 10833943.3 dated Mar. 27, 2013 (9 pages).
International Search Report and Written Opinion for Application No. PCT/US2012/039648 dated Jan. 2, 2013 (9 pages).
International Search Report and Written Opinion for Application No. PCT/US2012/039649 dated Jan. 3, 2013 (9 pages).
Office Action from the Japanese International Patent Office for Application No. 2010-508609 mailed Feb. 13, 2013 (7 pages).
Chinese Patent Office Action for Application No. 201080053567.5 dated Dec. 31, 2013 (19 pages, English translation only).
United States Patent Office Action for U.S. Appl. No. 12/600,441 dated Dec. 20, 2013 (12 pages).

* cited by examiner

SURFACE COATING SYSTEM AND METHOD OF USING SURFACE COATING SYSTEM

CROSS-REFERENCE TO RELATED APPLICATIONS

This patent application is a national stage filing under 35 U.S.C. 371 of International Application No. PCT/US2012/039648, filed on May 25, 2012, which claims the benefit of priority to U.S. Provisional Application No. 61/489,975, filed on May 25, 2011, the disclosures of which are incorporated by reference herein in their entireties. Priority to each application is hereby claimed.

INTRODUCTION

Floor care programs today are primarily used to both protect and enhance the appearance of a floor substrate, such as vinyl, linoleum, wood, concrete, marble, terrazzo, ceramic, and the like. These flooring materials are prone to wear and deterioration with traffic, such as pedestrian or vehicular traffic. Sacrificial coatings are often used to protect flooring materials from physical wear, scratching, staining, and chemical damage. These coatings are part of a floor care program which can include many different types of products, but generally involve the use of a base and/or finish applied to the surface of a floor substrate. This finish is then maintained with the use of cleaners and tools, which can include various buffing or burnishing machines. Although these programs are very effective, they are considered a large expense to customers. Additionally, if the surface becomes worn or unsatisfactory over time, it is necessary to entirely remove the floor finish or sealer utilizing various chemical compositions, commonly known as strippers. Such chemical stripping is time-consuming and labor-intensive.

It has also been common to treat many flooring substrates with durable semi-permanent coatings, such as those utilizing urethanes, epoxy, or silane technologies. These coating systems suffer from their lack of chemical removability and repairability, and removal often consists of sanding, mechanical abrasion, or chemical stripping. These are significant limitations and often result in unsatisfactory results.

Polymer-based floor coatings are an example of finishes or coatings that are typically applied with a mop or other applicator as an aqueous emulsion or solvent solution that dries to a hard protective film. The removal of these coatings from floor surfaces has traditionally required the use of corrosive chemical solutions, typically mixtures of alkalis and volatile solvents. Accordingly, recent trends in protective floor coatings are to move away from these traditional finishes and move toward the more durable, highly cross-linked coatings, such as epoxies, polyurethane dispersion, and UV-cured urethanes. These coatings, while they have enhanced durability over more traditional floor finishes, suffer in that they, too, eventually have to be removed from the floor due to scratching, scuffs, etc. However, while more traditional floor finishes can be removed chemically, the good chemical resistance or highly cross-linked nature of these more durable films makes them difficult, if not impossible, to remove by any means other than physical abrasion.

Additionally, with regard to either chemical or a mechanical abrasive stripping, often times the underlying flooring substrate or surface is damaged, for instance in the case of wood flooring where utilization of chemicals and/or water damages the wood surface.

Significant difficulties and deficiencies exist in repair, remediation or removal of the sacrificial or durable, semi-permanent coatings or finishes. Thus, there is an ongoing search for a surface coating system which would enable a surface to be coated with a finish, which can be quickly and easily applied, yet is readily removable and/or repairable after damage or wear.

In summary, a considerable number of deficiencies exist in the art relating to coating systems or finishes for surfaces, such as floor surfaces and the like.

SUMMARY

This disclosure provides a coating system comprising: a liquid adhesive layer composition comprising a heat-activated adhesive, wherein when the adhesive layer composition is applied on top of a surface, the adhesive layer composition dries to form an adhesive layer adhered to the surface; and a liquid maintenance layer composition comprising a dispersible polymer, wherein when the maintenance layer composition is applied on top of the adhesive layer, the maintenance layer composition dries to form a maintenance layer adhered to the adhesive layer, wherein the adhesive layer and maintenance layer form a peelable coating, wherein an adhesive strength between the adhesive layer and the maintenance layer is greater than an adhesive strength between the adhesive layer and the surface, and wherein the peelable coating has a tensile strength that is greater than the adhesive strength between the adhesive layer and the surface, such that the peelable coating is configured to be peeled from the surface without the adhesive layer and maintenance layer separating from one another.

In some embodiments, the adhesive layer composition may comprise a polyurethane. In some embodiments, the adhesive layer composition may comprise a first polyurethane composition, a second polyurethane composition, or a combination thereof. In some embodiments, the first polyurethane composition comprises a heat-activated polyurethane. In some embodiments, the second polyurethane composition comprises a polyether, a polyester, a polycarbonate, or a combination thereof.

In some embodiments, the maintenance layer composition may comprise a polyurethane.

In some embodiments, the adhesive layer composition or the maintenance layer composition may further comprise a wax emulsion. In some embodiments, the wax emulsion may comprise oxidized polyethylene or glycerol monostearate. In some embodiments, the adhesive layer composition or the maintenance layer composition further comprises at least one additive selected from plasticizers, neutralizers, wetting agents, matting agents, defoamers, coalescing agents, preservatives, dyes, pigments, fragrances, nanoparticles, optical components, and embedded particles.

In some embodiments, the surface may comprise a floor. In some embodiments, the surface may further comprise a base coating.

In some embodiments, the peelable coating may not whiten and/or blister after exposure to an alcohol for about 30 minutes, wherein the alcohol comprises at least one of methanol, ethanol, and isopropanol. In some embodiments, the peelable coating may comprise a peel strength of greater than about 50 gf/25 mm from the surface. In some embodiments, the peelable coating may comprise a peel strength of less than about 500 gf/25 mm from the surface. In some embodiments, the peelable coating may comprise an elongation at failure of at least about 25%.

This disclosure also provides methods of coating a surface comprising: applying a liquid adhesive layer composition comprising an emulsified heat-activated adhesive on top of a surface; drying the adhesive layer composition to form an adhesive layer adhered to the surface; applying a maintenance layer composition comprising an emulsified dispersible polymer on top of the adhesive layer; and drying the maintenance layer composition to form a maintenance layer adhered to the adhesive layer, wherein the adhesive layer and maintenance layer form a peelable coating, wherein an adhesive strength between the adhesive layer and the maintenance layer is greater than an adhesive strength between the adhesive layer and the surface, and wherein the peelable coating has a tensile strength that is greater than the adhesive strength between the adhesive layer and the surface, such that the peelable coating is configured to be peeled from the surface without the adhesive layer and maintenance layer separating from one another.

This disclosure also provides a peelable coating produced by the methods disclosed herein.

DETAILED DESCRIPTION

Figure 1:
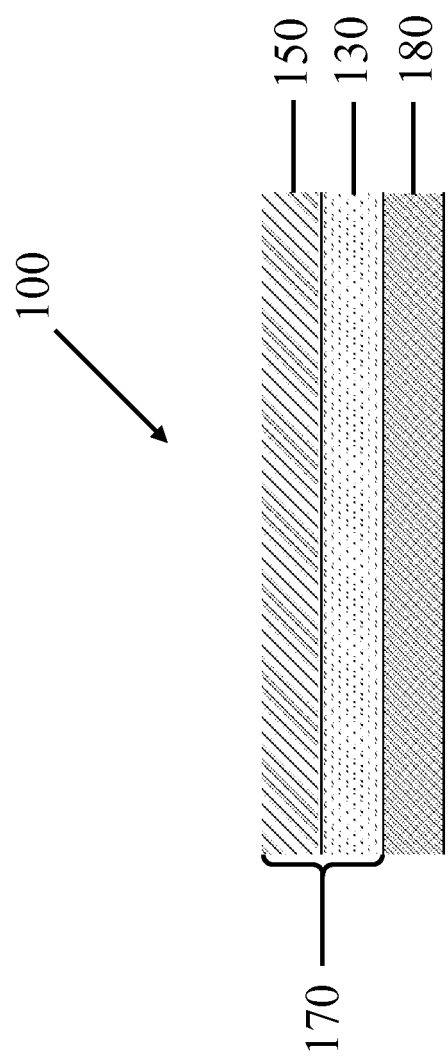
FIG. 1 shows an embodiment of a coating system of the disclosure.

The present disclosure is not limited in its disclosure to the specific details of construction, arrangement of components, or method steps set forth herein. The compositions and methods disclosed herein are capable of being made, practiced, used, carried out and/or formed in various ways. The phraseology and terminology used herein is for the purpose of description only and should not be regarded as limiting. Ordinal indicators, such as first, second, and third, as used in the description and the claims to refer to various structures or method steps, are not meant to be construed to indicate any specific structures or steps, or any particular order or configuration to such structures or steps. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification, and no structures shown in the drawings, should be construed as indicating that any non-claimed element is essential to the practice of the disclosure. The use herein of the terms "including," "comprising," or "having," and variations thereof, is meant to encompass the items listed thereafter and equivalents thereof, as well as additional items. Unless specified or limited otherwise, the terms "mounted," "connected," "supported," and "coupled" and variations thereof encompass both direct and indirect mountings, connections, supports, and couplings. Further, "connected" and "coupled" are not restricted to physical or mechanical connections or couplings.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure. Use of the word "about" to describe a particular recited amount or range of amounts is meant to indicate that values very near to the recited amount are included in that amount, such as values that could or naturally would be accounted for due to manufacturing tolerances, instrument and human error in forming measurements, and the like.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities.

As used herein, the term "adhesive" refers to a substance capable of holding materials together by surface attachment.

As used herein, the term "liquid" refers to being neither solid nor gaseous. Examples of liquid substances for the purpose of this invention include, without limitation, water, organic solvents, solutions, emulsions, and dispersions.

The present disclosure has potential applications on any surface where protection, cleanliness, gloss, scuff resistance, or slip resistance is desirable. Such surfaces include floors, food preparation surfaces, walls, stalls, counters, bathroom fixtures, etc. The surfaces to be finished may be made from a large variety of materials including, but not limited to, engineered stone, engineered wood, vinyl, marble, terrazzo, ceramic, linoleum, wood, metal, plastic, rubber, concrete, stone, vinyl composition tiles ("VCT"), and glass.

The disclosure relates to a coating system comprising a liquid adhesive layer composition comprising a heat-activated adhesive, wherein when the adhesive layer composition is applied on top of a surface, the adhesive layer composition dries to form an adhesive layer adhered to the surface, and a liquid maintenance layer composition comprising a dispersible polymer, wherein when the maintenance layer composition is applied on top of the adhesive layer, the maintenance layer composition dries to form a maintenance layer adhered to the adhesive layer. The heat-activated adhesive may result in a tack-free surface upon drying. A finished coating is formed after application of the maintenance layer composition to the adhesive layer. The coating system optionally includes a base coating composition. In addition, the optional removal tool may be a razor blade or the like or it may be a tool such as that described in U.S. Application No. 61/023,351 filed Jan. 24, 2008, which is incorporated by reference herein in its entirety. One of ordinary skill in the art would be able to determine suitable removal tool for use in the invention. The finished coating has a tensile strength that is greater than the peel strength of the finished coating. This allows the finished coating to be non-chemically removed from the surface with minimal to no damage to the surface.

The adhesive layer composition may comprise at least about 10 wt %, at least about 15 wt %, at least about 20 wt %, and at least about 25 wt % heat-activated adhesive. The adhesive layer composition may comprise less than about 95 wt %, less than about 90 wt %, less than about 85 wt %, and less than about 80 wt % heat-activated adhesive. This includes about 10 to about 95 wt %, about 15 to about 90 wt %, about 20 to about 85 wt %, and about 25 wt % to about 80 wt % heat-activated adhesive.

In some embodiments, the adhesive layer composition may comprise a first polyurethane composition, a second polyurethane composition, or a combination thereof. In some embodiments, the first polyurethane composition may comprise a heat-activated polyurethane. In some embodiments, the second polyurethane composition may comprise polyether, a polycarbonate, or a combination thereof. In some embodiments, the second polyurethane composition may comprise polyester. In some embodiments, the first polyurethane composition may comprise polyester. In some embodiments, the heat-activated adhesive may comprise about 25 wt % to about 100 wt % of the first polyurethane composition and 0 wt % to about 50 wt % of the second polyurethane composition. In some embodiments, the heat-activated adhesive may comprise a DISPERCOLL U® polyurethane (Bayer Material Science AG, Germany), such as, for example, DISPERCOLL U®53, DISPERCOLL U®54, DISPERCOLL U®56, DISPERCOLL U®42, DISPERCOLL U®8755, or combinations thereof. In some embodiments, the heat-activated adhesive may comprise IMPRANIL® DLU (Bayer MaterialScience AG, Germany), IMPRANIL® XP2611 (Bayer Material Science AG, Germany), or combinations thereof.

The adhesive layer may comprise at least about 50 wt %, at least 80 wt %, and at least 85 wt % heat-activated adhesive. The adhesive layer may comprise less than about 100 wt %, less than about 99 wt %, less than about 98 wt %, less than about 97 wt %, less than about 96 wt %, less than about 95 wt %, less than about 94 wt %, less than about 93 wt %, less than about 92 wt %, less than about 91 wt %, less than about 90 wt %, and less than about 85 wt % heat-activated adhesive. This includes about 50 wt % to about 100 wt %, about 85 wt % to about 99 wt %, and about 90 wt % to about 98 wt % heat-activated adhesive.

The maintenance layer composition may comprise at least about 10 wt %, at least about 15 wt %, at least about 20 wt %, at least about 25 wt %, and at least about 30 wt % dispersible polymer. The maintenance layer composition may comprise less than about 90 wt %, less than about 85 wt %, less than about 80 wt %, less than about 75 wt %, and less than about 70 wt % dispersible polymer. This includes about 10 to about 90 wt %, about 15 to about 85 wt %, about 20 to about 80 wt %, about 25 wt % to about 75 wt %, and about 30 wt % to about 70 wt % dispersible polymer.

The dispersible polymer may comprise at least one of a UV-cured polymer, a nylon, an epoxy, a polyacrylate, a polystyrene acrylate, a polyurethane, a polyurea, a polycarbonate, a polyester, a polyether, and a combination thereof. Suitable maintenance layer compositions can include commercially-available materials such as, for example, BAYHYDROL® UH 2606 (Bayer Material Science of Pittsburg, Pa.), BAYHYDROL® UH 2558 (Bayer Material Science of Pittsburg, Pa.), TURBOSET™ 2025 polyurethane dispersion (Lubrizol Advanced Material Inc., Cleveland, Ohio), NEOPAC® R-9045 (DSM NeoResins, Waalwijk, The Netherlands), WITCOBOND® 386-99 (Chemtura, Middlebury, Conn.), and WITCOBOND® 788 (Chemtura, Middlebury, Conn.).

The maintenance layer may comprise at least about 50 wt %, at least about 70 wt %, and at least about 90 wt % dispersible polymer. The maintenance layer may comprise less than about 100 wt %, less than about 99 wt %, less than about 98 wt %, less than about 97 wt %, and less than about 96 wt % dispersible polymer. This includes about 50 to about 100 wt %, about 70 to about 99 wt %, and about 90 wt % to about 98 wt % dispersible polymer.

Dispersible adhesives and dispersible polymers have the characteristic that they are easily dispersed on, or applied to, a surface, i.e., with spraying, spreading, brushing, rolling, wiping, etc. Dispersible adhesives and polymers are typically liquids, however, they may take the form of aerosols. The dispersible adhesives and polymers typically comprise one or more polymers that are suspended in a carrier medium such as water, a propellant, or an organic solvent.

Other additives such as waxes, plasticizers, neutralizers, wetting agents, defoamers, coalescing agents, preservatives, dyes, pigments, fragrances, optical components (e.g., matting agents), nanoparticles, and embedded particles can be added to the maintenance layer composition or the adhesive layer composition.

In some embodiments, the wax may include a wax emulsion such as, for example, non-ionic or ionic polyethylene or oxidized polyethylene emulsions, polypropylene propylene emulsions, ethyl acrylate copolymer wax emulsions, ethyl acrylate-maleic anhydride copolymer emulsions, polyvinyl ether emulsions, paraffin and natural wax emulsions. In some embodiments, the non-ionic wax emulsions may include, without limitation, A-C®316, A-C®392, A-C®540 (Honeywell, Morristown, N.J.), or EPOLENE® E-43 (Westlake Chemical, Houston, Tex.). In some embodiments, the wax emulsion may be modified and incorporated with a releasing agent, e.g., glycerol monostearate ("GMS"). In some embodiments, the wax emulsion may be in the amount of up to about 10 wt % or up to about 5 wt % or up to about 1 wt % of the maintenance layer composition or the adhesive layer composition. In other embodiments, the wax emulsion may be present in at least about 0.1 wt % or at least about 0.5 wt %. This includes ranges of about 0.1 to about 10 wt % and about 0.5 to about 5 wt %. Some embodiments include wax emulsion in the amount of about 3 wt %.

Suitable plasticizers include, but are not limited to, dibutyl phthalate, butyl benzyl phthalate, diisooctyl phthalate, diethylene glycol dibenzoate, triethylene glycol dibenzoate, dipropylene glycol dibenzoate, tributoxy ethylphosphate and many other plasticizers known to those skilled in the art. In some embodiments, the plasticizer is in the amount of up to about 5 wt % or up to about 3 wt % or up to about 1 wt % of the maintenance layer composition or the adhesive layer composition. In other embodiments, the plasticizer is present in at least about 0.1 wt % or at least about 0.5 wt %. This includes ranges of about 0.1 to about 5 wt % and about 0.5 to about 3 wt %. Some embodiments include plasticizer in the amount of about 0.5 wt %.

Neutralizers can be used to adjust the pH of the maintenance layer composition or the adhesive layer composition. For example, ammonia, ammonium hydroxide, amines, hydroxides, silicates, phosphates and other additives known to those skilled in the art can be used to adjust the pH of the system if deemed necessary in an amount up to about 2 wt % or up to 1 wt % or up to about 0.5 wt % of the maintenance layer composition or the adhesive layer composition. In other embodiments, the neutralizer can be present in an amount of at least about 0.05 wt % or at least about 0.1 wt %. This includes ranges of about 0.05 to about 2 wt % and about 0.1 to about 1 wt %. Alternative embodiments can include about 0.1 wt % neutralizer.

Wetting agents may include compounds such as ethoxylated non-ionic fluorochemicals, other fluorochemicals, alcohol ethoxylates, organo-silicones, or others known to those of skill in the art. These materials can be used up to about 3 wt %, up to about 2 wt %, or up to about 1 wt % of the maintenance layer composition or the adhesive layer composition. In other embodiments, the wetting agent can be present in an amount of at least about 0.01 wt %, at least about 0.03 wt %, or at least about 0.05 wt %, or at least about 1.0 wt %. This includes ranges of about 0.01 to about 3 wt %, about 0.03 to about 2 wt %, and about 0.05 to about 1 wt %. Some embodiments utilize about 0.02 wt % wetting agent. Still other embodiments include about 0.03 wt % wetting agents. In some embodiments, the wetting agent may include, without limitation, CAPSTONE™ FS-60, CAPSTONE™ FS-63 (DuPont Chemical and Fluoroproducts, Wilmington, Del.), CHEMGUARD™ S-761P (Chemguard, Mansfield, Tex.).

Defoamers include, but need not be limited to organic polymer, polysiloxane, silicone, or acetylene-based defoamers. The defoamer may be present in about 0 to about 2 wt % of the maintenance layer composition or the adhesive layer composition. In some embodiments, the defoamer may include, without limitation, TEGO® FOAMEX 822 (Evonik Tego Chemie GmbH, Essen, Germany)

Coalescing agents such as glycol ethers including, but not limited to, diethylene glycol ethyl ether, ethylene glycol 2-ethylhexyl ether, and dipropylene glycol n-butyl ether, or other suitable solvents can be utilized. In some embodiments, the coalescing agent is in the range of up to about 10 wt % or up to about 8 wt % or up to about 6 wt % of the maintenance layer composition or the adhesive layer composition. In other embodiments, the coalescing agent is present in at least about 0.1 wt %, at least about 0.5 wt %, or at least about 1 wt %. This includes ranges of about 0.1 to about 10 wt %, about 0.5 to about 8 wt %, and about 1 to about 6 wt % coalescing agent.

Various preservatives, dyes, pigments, and fragrances can also be included in some embodiments. Suitable preservatives may include PROXEL GXL (1,2-benzisothiazolin-3-one Na-salt (20%)). Suitable dyes may include, for example, FD&C blue #'1 (Keystone, Chicago, Ill.), and anatase titanium dioxide AT-1 white dye (Hankok Titanium Industry, Seoul, Korea) Suitable pigments may include some organic pigments, such as, for example, azo metal complexes and dioxazine, and inorganic pigments, such as, for example, carbon black, titanium dioxide and azurite. Suitable fragrances may include Robertet fragrances, including Robertet 98M.

Additives that affect the optical properties of the adhesive or maintenance layer can be added ("optical components") in order to reduce glossiness or produce a matte finish ("matting agents"). A matte finish can improve the appearance of the floor by making defects less noticeable, and can give the floor a more uniform appearance. Suitable matting agents include, but are not limited to, fumed silica, silica gels, polyethylene, and hollow glass microspheres. These are typically used in a range of 0.5 to 10 wt % of the adhesive layer composition or maintenance layer composition. In other embodiments, in which a glossier finish is desired, the matte optical components may not be included.

Additionally, nanoparticles, embedded particles, and other additives can also be included in some embodiments. Suitable nanoparticles may be those with diameters of 1-100 nanometer and may include, for example, carbon, ceramics, glass-ceramics, polymers, and nano-sized quantum dots in the shape of a sphere, a core-shell sphere, or a tube. These are typically used in a range of about 0.05 to about 10 wt % of the adhesive layer composition or maintenance layer composition. Suitable embedded particles may include glass, ceramics, and highly cross-linked hard polymer. These are typically used in a range of about 0.05 to about 5 wt % of the adhesive layer composition or maintenance layer composition. Embedded particles may have a size of about 51 to about 500 microns.

By incorporating certain wetting agents, plasticizers, and/or coalescents, the adhesive layer or maintenance layer can be achieved with reduced or eliminated chances of incurring aesthetically unpleasant film defects such as "hazing", "cracking", "blooming", "crazing", and many other types of film defects commonly known to those of skill in the art. Without wishing to be limited by theory, it is believed that adding the surfactants, plasticizers, and/or coalescents enables better inter-coat adhesion and film-formation, which inherently reduces the likelihood of such defects.

The balance of the maintenance layer composition and the adhesive layer composition may be water.

Suitable base coating compositions include, but are not limited to, UV-cured polymers, polyacrylates, polystyrene-acrylate, polyurethanes, epoxies, and polyureas. Other suitable compositions are known to those skilled in the art. The base coating composition may be the same as the maintenance layer composition, but this is not required or necessary. Suitable water-borne polyacrylate or polystyrene-acrylate based compositions include a polyacrylate or polystyrene component including but not limited to, styrene, methacrylic acid, butyl acrylate, and methylacrylate, isobutyl methacrylate derived monomeric units. In other embodiments, base coating 250 can also include vinyl-acrylic compounds. In some embodiments, a blend of base coating compositions may be used.

Suitable base coating compositions may include commercially available floor finish materials such as GEMSTAR LASER and GEMSTAR POLARIS and TAJ MAHAL and FIRST BASE available from Ecolab, Inc. of St. Paul, Minn., BETCO BEST and BETCO EXPRESS and BETCO FLOOR SEALER floor finish from Betco Corp. of Toledo, Ohio, CITATION and CASTLEGUARD floor finish available from Buckeye International of Maryland Heights, Mo., and IRONSTONE and PLAZA PLUS and PREMIA and HIGH NOON and FRESCOMAX and OVER& UNDER, SIGNATURE, and JONSEAL from Diversey, Inc. of Sturtevant, Wis.

The disclosure may provide at least one advantage identified below. Coating systems of the disclosure can be used to coat a surface with a removable, durable coating in a few minutes to a few hours, with removal of the durable coating taking seconds to minutes. The coating system can be applied with spraying, rolling, brushing, painting, mopping, or spreading; however other techniques will be known to those of skill in the art. Because the coating systems can use water-dispersed polymer compositions, the coating systems may produce fewer organic volatiles compared to the prior art. Reduced organic volatiles benefit the environment as well as the health of the user, especially when the user would be otherwise exposed to the organic volatiles in a confined space. Additionally, because the used coatings may be simply peeled away, there may be no need for caustic stripping agents. Once removed, the used coatings may be recycled or sent to a landfill.

FIG. 1 shows a coating system 100 of this disclosure and which may be prepared using methods of the disclosure. Coating system 100 comprises adhesive layer 130 and maintenance layer 150, which are both applied to surface 180, such as a floor. The adhesive layer 130 and maintenance layer 150 collectively may form a peelable layer or coating 170.

The adhesive layer 130 forms on top of the surface 180. The adhesive layer 130 may be less than about 1 mm thick, less than about 0.5 mm thick, or less than about 0.1 mm thick. In some embodiments, the adhesive layer 130 may be at least about 0.001 mm thick, at least about 0.005 mm thick, at least about 0.01 mm thick, or at least about 0.015 mm thick. In some embodiments, the thickness of the adhesive layer 130 may be about 1 mm to about 0.001 mm, about 0.5 mm to about 0.005 mm, or about 0.1 mm to about 0.01 mm. The adhesive layer 130 is applied at a rate of about 5 g/ft$^2$ to about 25 g/ft$^2$.

The maintenance layer 150 forms on top of the adhesive layer 130. The maintenance layer 150 may be less than about 2 mm thick, less than about 1 mm thick, less than about 0.5 mm thick, or less than about 0.25 mm thick. In some embodiments, the maintenance layer 150 may be at least about 0.01 mm thick, at least about 0.05 mm thick, at least about 0.1 mm thick, or at least about 0.15 mm thick. In some embodiments, the maintenance layer 150 thickness may be about 2 mm to about 0.01 mm, about 1 mm to about 0.05 mm, or about 0.5 mm to about 0.1 mm, about 0.25 mm to about 0.15 mm. The maintenance layer 150 may be applied at a rate of about 5 g/ft$^2$ to about 40 g/ft$^2$.

The maintenance layer composition can have a solids content of about 15% to about 50 wt % solids. This includes embodiments having a solids content of about 15 to about 35 wt %, which is suitable in some applications. The maintenance layer composition can be applied to provide about a 10 mil wet coating thickness. In some exemplary embodiments, the maintenance layer composition has a solids content of about 27 wt % and produces a hardened dried maintenance layer with a thickness of about 2 mil.

Typically, an adhesive layer composition is applied to the surface 180, the adhesive layer composition is allowed to dry for some time to form the adhesive layer 130, and then the maintenance layer composition is applied to adhesive layer 130 which has formed on surface 180. Typically, the maintenance layer composition is allowed to dry for some time, during which the maintenance layer 150 forms on the adhesive layer 130, forming the peelable coating 170. The peelable coating 170 may have a tensile strength greater than a peel strength of the peelable coating 170 from surface 180.

Multiple layers of the maintenance layer composition may be applied to completely cover the adhesive layer 130, resulting in a maintenance layer 150 with a total thickness of about 0.2 mil to about 2 mil in some embodiments. This total thickness may be at least about 0.1 mil, at least about 0.5 mil, at least about 1 mil, at least about 1.5 mil, at least about 2 mil, at least about 2.5 mil, at least about 3 mil, at least about 3.5 mil, and at least about 4 mil. The total thickness may be less than about 10 mil, less than about 8 mil, less than about 6 mil, less than about 4 mil, and less than about 3 mil. One to ten or more coats of the maintenance layer composition can be applied, in some embodiments. Some embodiments of the surface coating system can include two to six layers of maintenance layer 150. The maintenance layer(s) can also be scrubbed and recoated over time as needed, further increasing their thickness. More than one different type of formulation of the maintenance layer composition may be used in successive coats.

Figure 2:
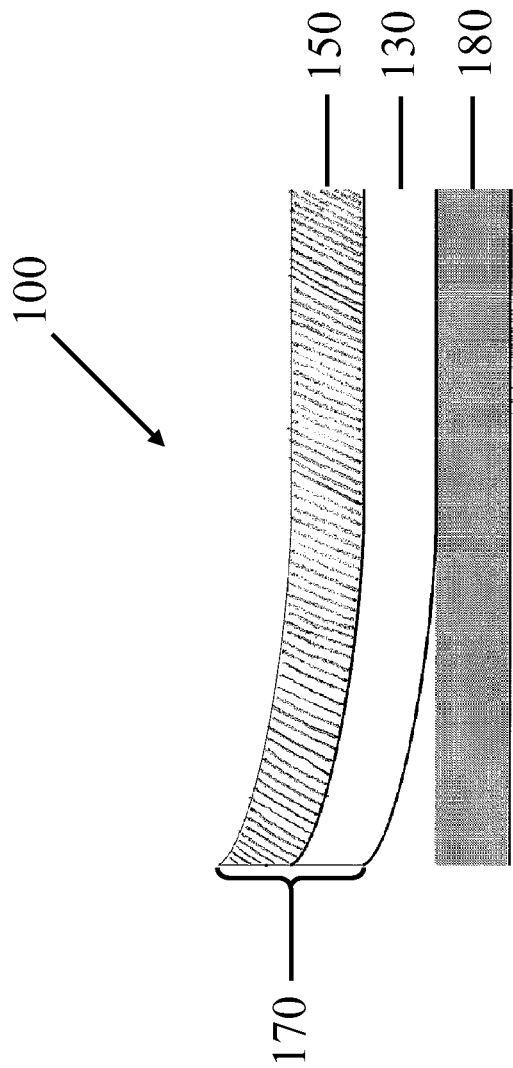
FIG. 2 shows another embodiment of a coating system of the disclosure.

The peelability of the adhesive layer 130 is illustrated in FIG. 2, which shows the removal of adhesive layer 130 and maintenance layer 150 from the surface 180 as the peelable coating 170. The adhesive layer composition is typically allowed to dry for at least about 1 minute, typically for at least about 10 minutes, more typically for at least about 60 minutes. The maintenance layer composition is typically allowed to dry for at least about 1 minute, typically for at least about 10 minutes, more typically for at least about 60 minutes.

The peelable coating 170 may have an elongation failure point of greater than about 10%, typically greater than about 25%, or more typically greater than about 50%. The elongation failure point may be 150%. In some embodiments, the elongation failure point of the peelable coating 170 may be less than about 350%, or less than about 300%, or less than about 250%, or less than about 200%. In some embodiments, the elongation failure point of the peelable coating 170 may be about 10% to about 350%, about 25% to about 300%, and about 50% to about 250%.

The coating system 100 may not whiten after exposure to an alcohol for about 30 minutes or about 60 minutes. The alcohol may include, for example, at least one of methanol, ethanol, and isopropanol.

The coating system 100 may not blister after exposure to an alcohol for about 30 minutes or about 60 minutes. The alcohol may include, for example, at least one of methanol, ethanol, and isopropanol.

Figure 3:
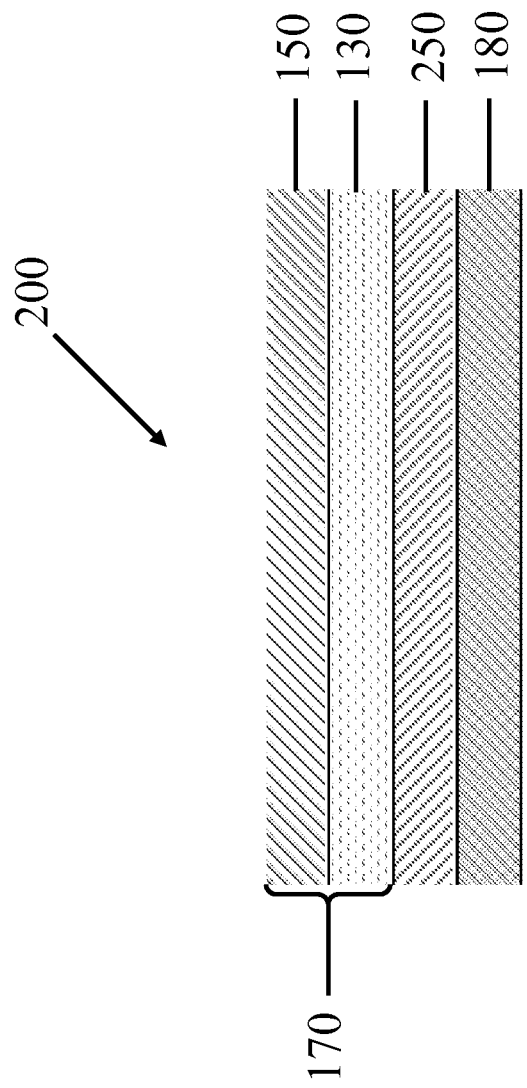
FIG. 3 shows another embodiment of a coating system of the disclosure.

FIG. 3 shows an alternative coating system 200 which may be prepared using the coating system and methods of the disclosure. The alternative coating system 200 comprises the base coating 250, the adhesive layer 130, and the maintenance layer 150, which are both applied to surface 180, such as a floor. The adhesive layer 130 and the maintenance layer 150 in alternative coating system 200 may be substantially similar to the adhesive layer 130 and the maintenance layer 150 in the coating system 100, and collectively may form a peelable layer or coating 170. (The adhesive layer 130 in the alternative coating system 200 may comprise additional additives to impart better compatibility with base coating 250.) The base coating 250 is a continuous coating, which forms on the surface 180 after a base coating composition of the disclosure is applied to the surface 180. The base coating 250 comprises at least one of UV-cured polymers, nylons, epoxies, polyacrylates, polystyrene acrylates, polyurethanes, polyureas, and combinations thereof. The base coating 250 provides a continuous, level surface for the application of adhesive layer 130, and subsequent application of maintenance layer 150. Typically the base coating composition is applied to surface 180 and then allowed to dry to form base coating 250. The base coating composition is typically allowed to dry for at least about 1 minute, typically for at least about 10 minutes, more typically for at least about 60 minutes. The alternative coating system 200 is suitable for use when surface 180 is not smooth, for example, a tile floor.

Figure 4:
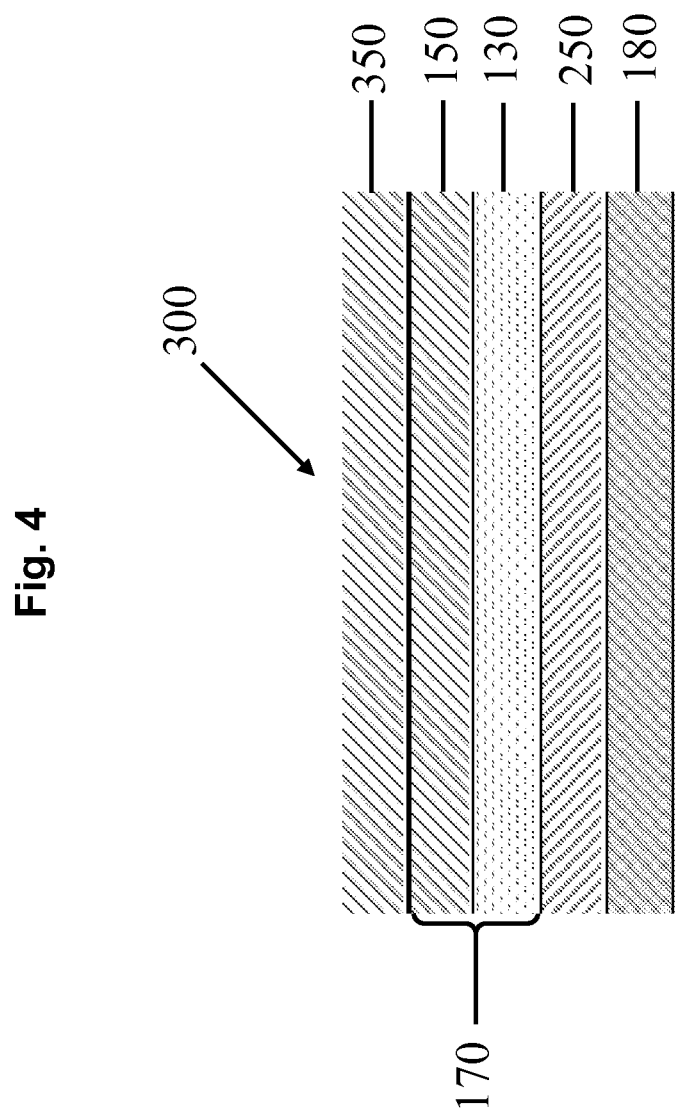
FIG. 4 shows another embodiment of a coating system of the disclosure.

FIG. 4 shows an alternative coating system 300 which may be prepared using the coating system and methods of the disclosure. The alternative coating system 300 comprises a base coating 250, an adhesive layer 130, a maintenance layer 150, and a second maintenance layer 350, which are all applied to surface 180, such as a floor. The adhesive layer 130 and the maintenance layer 150 in the alternative coating system 300 are substantially similar to the adhesive layer 130 and the maintenance layer 150 in the coating system 100. The second maintenance layer 350 may be substantially similar to the maintenance layer 150, however it is possible to use different maintenance layer compositions according to the disclosure. While the base coating 250 is shown used with second maintenance layer 350 in the alternative coating system 300, the second maintenance layer 350 can be used with a coating system 100, comprising only an adhesive layer 130 and a maintenance layer 150. A second maintenance layer 350 may comprise any of the dispersible polymers suitable for use as maintenance layers of the disclosure.

Heat-activated adhesives are a class of adhesives that require a temperature at or above a crystalline melting point to set them, wherein the crystalline melting point of the polymer within the heat-activated adhesive may be at least about 30° C. Thus, after application of a heat-activated adhesive to a substrate, the resulting film becomes tacky only after heating of the crystalline polymer segments above a minimum activation temperature, i.e., the crystalline melting point of the heat-activated adhesive. Heat-activated adhesives suitable for use in adhesive layer compositions of the disclosure include heat-activated adhesives comprising polymers which result in an adhesive which has an adhesive strength that allows a finished coating comprising adhesive layer 130 and maintenance layer 150 to be peeled away from surface 180. Heat-activated adhesive materials include styrene-butadiene latex, acrylic latex material, polyurethane latex, polyvinyl acetate emulsions, epoxy-polyurethane latex, ethylene-vinyl acetate latex, and combinations thereof.

In some embodiments, the crystalline melting point of the polymer within a heat-activated adhesive may be at least about 30° C., at least about 40° C., at least about 50° C., at least about 60° C., at least about 70° C., at least about 80° C., at least about 90° C., at least about 100° C., at least about 110° C., or at least about 120° C. Polyurethane latex including partially crystallized polyurethane is one example of a common material in a heat-activated adhesive. Other examples of heat-activated adhesives include, but are not limited to, DISPERCOLL U® polyurethane dispersions (Bayer MaterialScience AG, Germany), NWC™ styrene acrylic polyurethane and vinyl acetate dispersions (Ashland, Covington, Ky.), MACEKOTE 1371 Z aliphatic, co-solvent free, Zero NMP polyurethane dispersion (Mace Company, Dudley, Mass.), and CYDROTHANE® HA aliphatic polyester polyurethane dispersions (Cytec Industries Inc., Woodland Park, N.J.).

In some embodiments, the heat-activated adhesive may include an aliphatic polyether polyurethane, a polycarbonate polyurethane, a polyester polyurethane, and combinations thereof. In some embodiments, the heat-activated adhesive can include, but is not limited to, IMPRANIL® DLU polyether/polycarbonate polyurethane dispersion (Bayer MaterialScience AG, Germany) and IMPRANIL® 2611XP polyester polyurethane dispersion (Bayer MaterialScience AG, Germany).

Figure 5:
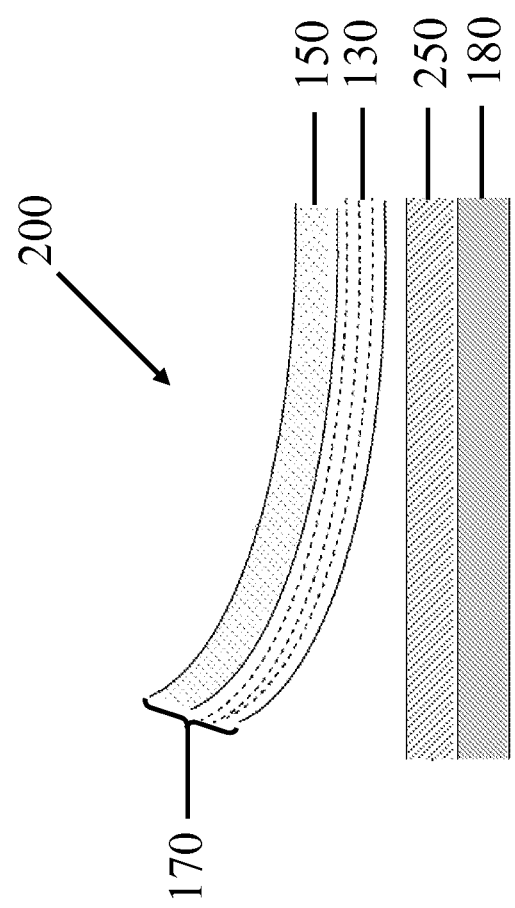
FIG. 5 shows a use of an embodiment of a coating system of the disclosure.

The peelability of adhesive layer 130 is illustrated in FIG. 5, which shows the removal of adhesive layer 130 and maintenance layer 150 (i.e., as a peelable layer 170) from base coating 250 on surface 180 in the alternative coating system 200. When coating system 100 is used, adhesive layer 130 and maintenance layer 150 are directly removed from surface 180 (not shown). When used, base coating 250 is designed to remain adhered to surface 180, as shown in FIG. 5. Adhesive layer 130 and maintenance layer 150 are designed to remain adhered to one another, yet peel away from base coating 250 or surface 180 to enable stripping and refinishing of surface 180 with minimal to no damage to surface 180. Coating system 100 comprising adhesive layer 130 and maintenance layer 150 may have a peel strength greater than about 50 gf/25 mm (gf=grams force), typically greater than about 100 gf/25 mm, more typically greater than about 200 gf/25 mm. In some embodiments, peelable coating 170 may have a peel strength less than about 500 gf/25 mm, less than about 400 gf/25 mm, or less than about 300 gf/25 mm. In some embodiments, peelable coating 170 may have a peel strength of about 50 gf/25 mm to about 500 gf/25 mm, about 100 gf/25 mm to about 400 gf/25 mm, or about 200 gf/25 mm to about 300 gf/25 mm.

While a removal tool may be unnecessary with coating systems of the disclosure, coating systems may optionally include a removal tool, such as a razor blade, or a removal tool similar to that described in U.S. application Ser. No. 12/863,966 filed Jul. 21, 2010 which is incorporated by reference herein in its entirety. One of ordinary skill in the art would be able to determine other suitable removal tools for use in the disclosure. In some embodiments, the removal tool may be a plastic ribbon that has been embedded in the coating.

Figure 6:
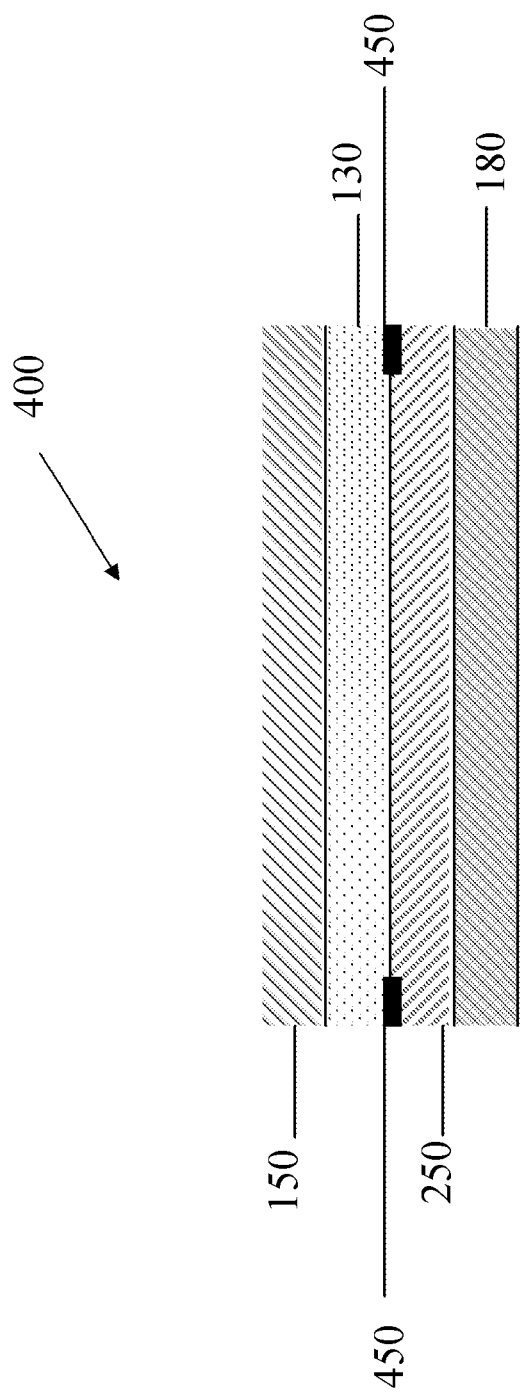
FIG. 6 shows another embodiment of a coating system of the disclosure.

In some embodiments, a removal tool may be included in the coating, such as in coating system with a starter mechanism 400, shown in FIG. 6. Starter mechanism 450 assists in initiating the peeling of adhesive layer 130 and maintenance layer 150 from base coating 250 or from surface 180 in a finished coating with starter mechanism (not shown). Starter mechanism 450 may be in the shape of a wire, ribbon or floss, and may be constructed from metal or plastic. Starter mechanism 450 may be opaque or colored to make starter mechanism 450 easily identifiable, or starter mechanism 450 may be clear to hide its presence in the finished coating.

Figure 7:
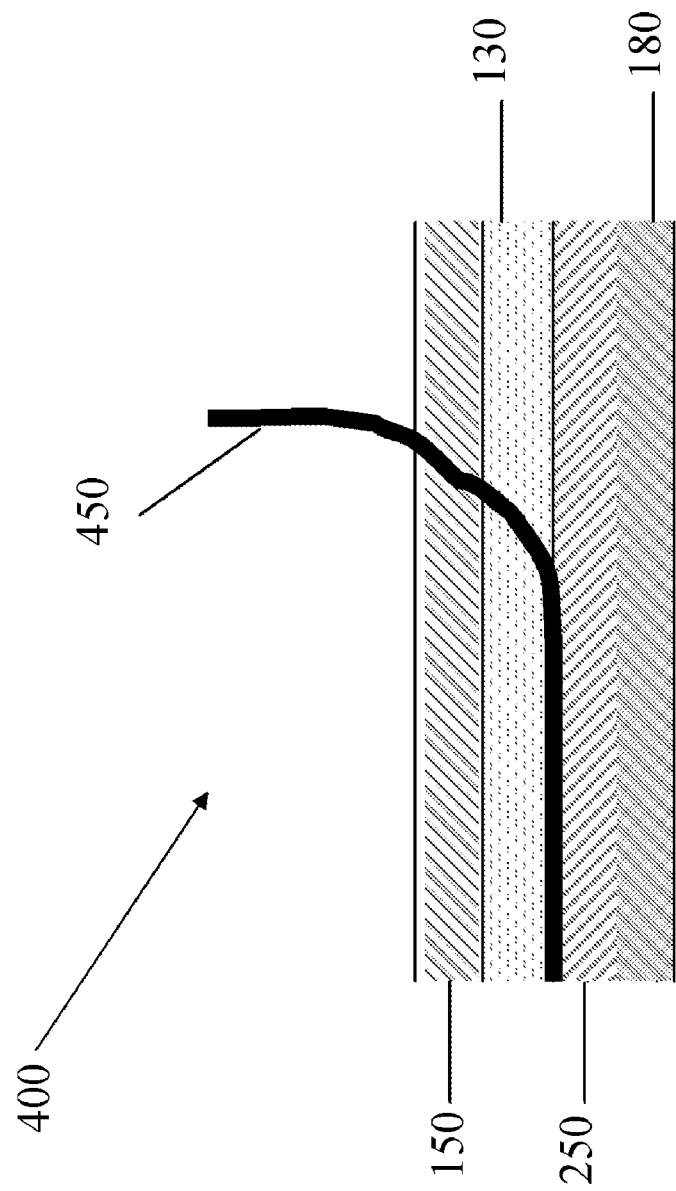
FIG. 7 shows another embodiment of a coating system of the disclosure.

As shown in FIG. 7, starter mechanism 450 is simply pulled away from base coating 250 providing a clean edge (not shown) of adhesive layer 130 and maintenance layer 150, which is easy to pull away from base coating 250 and/or surface 180.

Figure 8:
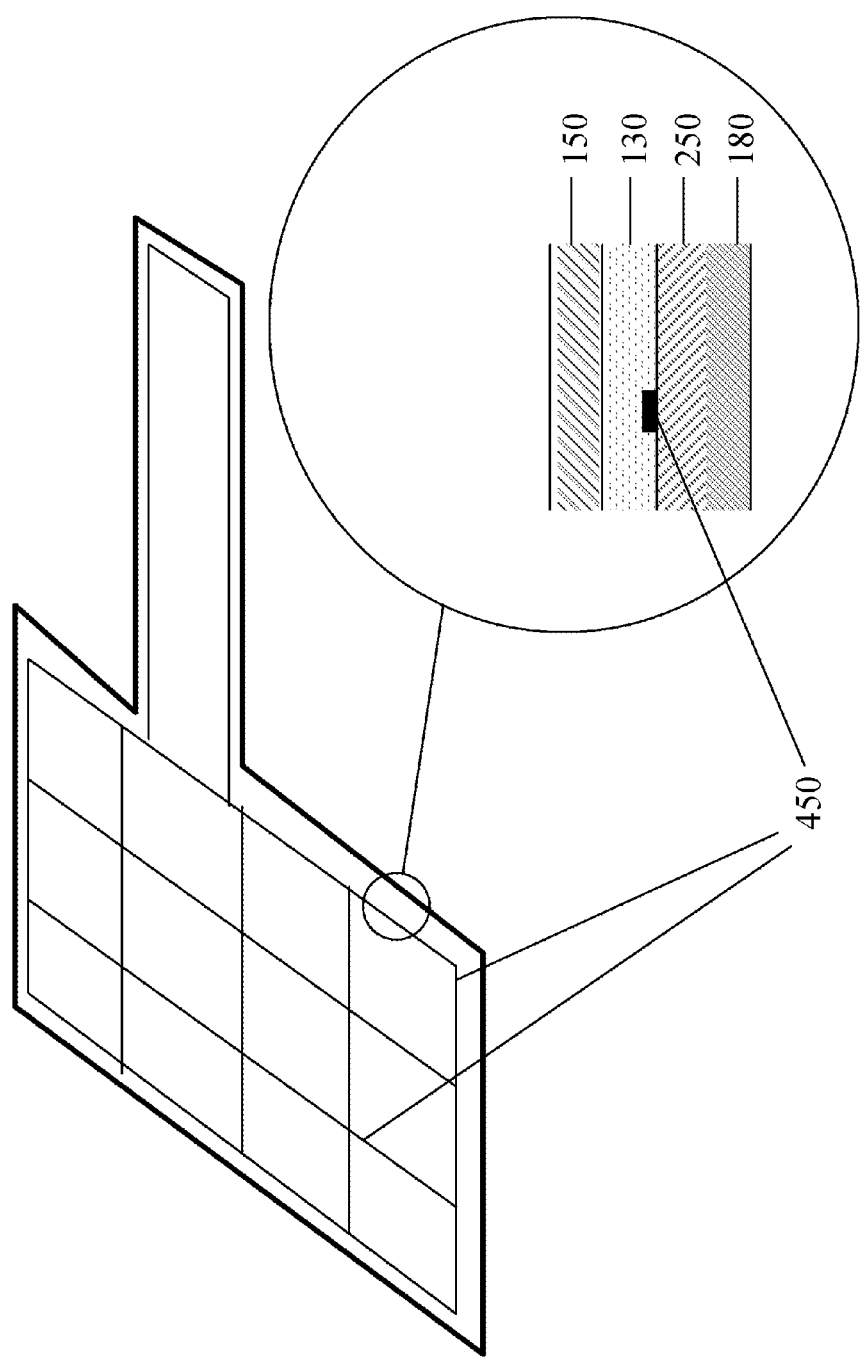
FIG. 8 shows another embodiment of a coating system of the disclosure.
Figure 9:
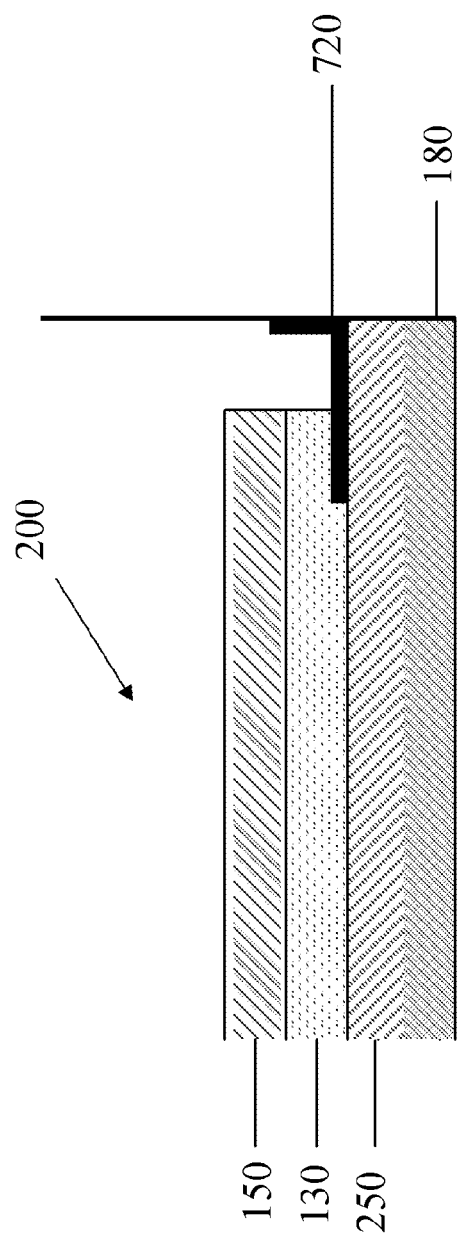
FIG. 9 shows a use of an embodiment of a coating system of the disclosure.

As shown in FIG. 8, a set of starter mechanisms 450 may be placed around the perimeter of surface 180 to provide a series of starting points for removing the coatings. Starter mechanisms 450 may also be placed across surface 180 to allow the finished coating to be pulled up in sheets of a manageable size. While starter mechanism 450 is shown in FIGS. 6 and 7 as being thinner than adhesive layer 130, starter mechanism 450 is typically at least as thick as adhesive layer 130. Additionally, starter mechanism 450 may be placed on surface 180 or base coating 250 prior to application of the adhesive layer composition, or starter mechanism 450 may be placed atop adhesive layer 130 prior to application of the maintenance layer composition. Regardless of the use of starter mechanism 450, scraping tool 720 may be used to assist a user in removing adhesive layer 130 and maintenance layer 150 from base coating 250 and/or surface 180 as shown in FIG. 9.

The starter mechanisms 450 can be strategically placed on a surface in order to facilitate removal of maintenance layer 150 and, where present, second maintenance layer 350. In some embodiments, starter mechanisms 450 are placed on opposite edges of the surface from which maintenance layer 150 is to be removed. For example, if the diagram shown in FIG. 8 represents a cross-section of a hallway, the starter mechanisms 450 could be placed on opposite sides of the hallway against the edges of adjacent walls. Thus, pulling up starter mechanisms 450 separates the layers from the walls to facilitate complete removal of the layers from the walls. In certain embodiments, starter mechanisms 450 are applied in a grid pattern, while in other embodiments starter mechanisms 450 are only applied in parallel side-by-side fashion. In still other embodiments, starter mechanisms 450 are applied in a pattern that facilitates removal and replacement of the layers in known or anticipated high-traffic areas of a floor, such as in the center of a hallway or in the vicinity of a doorway.

In some embodiments, starter mechanism 450 is relatively inconspicuous. For example, starter mechanism 450 can be clear and colorless, or starter mechanism 450 can have the same texture and/or color as surface 180 to which the surface coating system is applied. In other embodiments, starter mechanism 450 can be selected so as to be readily visible through the layers and, optionally, conventional floor finish coatings for quick identification. Examples starter mechanisms 450 can include tapes (e.g., polyester-based tapes), string, and plastic. Commercially available starter mechanisms can include fishing line, dental floss (comprising, e.g., thin nylon filaments or a ribbon made of a plastic such as polyethylene or Teflon), automobile pinstriping tape, and Linered Removable Acrylic Tape (#S922) available from Specialty Tapes of Franksville, Wis. In some embodiments, for example, starter mechanism 450 is an adhesive-backed tape that is about 6 mm wide and about 4.5 mil thick (1 mil is approximately 0.001 inch).

In some embodiments, starter mechanism 450 is applied to at least a portion of the base coating prior to the addition of the adhesive layer 130. However, it will be understood that starter mechanism 450 can be made from a variety of different materials, can have a variety of shapes and sizes, and can be applied in one or more places on base coating 250. Adhesive layer 130 can be applied to starter mechanism 450 and the base coating 250.

In some embodiments, one or more layers of peelable coating 170 are applied to an installable flooring substrate (e.g. tiles or sheet materials) during the manufacture thereof. Thus, after the flooring substrate has been installed, its surface can be renewed by removing the topmost layer of peelable coating 170. This can be repeated for as many layers as have been factory-applied to the substrate. In some embodiments, starter mechanisms 450 of each layer are offset, or staggered, from other starter mechanisms 450 of one or more nearby layers in order to prevent a possible buildup of layered materials that could distort the surface.

To remove maintenance layer 150 and second maintenance layer 350, or other layers thereon, starter mechanism 450 is pulled through the top layers to create a defined edge that can be used to peel maintenance layer 150 from the underlying base coating 250 as shown in FIG. 7. Starter mechanism 450 can be accessed by way of a starter strip, which can be exposed above the various layers, or by cutting through the top layers to reach an embedded starter strip.

In other embodiments, coating system 100 is applied to surfaces other than floors, including, for example, other substantially horizontal surfaces, such as surgical tables, food preparation surfaces, desks, tables, as well as vertical surfaces, such as walls, windows, and the like, as well as irregular surfaces, such as food preparation equipment, vessels, tanks, parts, and the like, to name but a few possible uses.

In some embodiments, the maintenance layer composition is a water-borne composition. Maintenance layer 150 is the source of the durability and wear resistance of coating systems of the disclosure. Wear resistance includes resistance to physical wear, scratching, staining, and chemical damage, among other things. The maintenance layer composition should be compatible with the adhesive layer composition such that a defect-free durable coating results.

In some embodiments, the maintenance layer dispersible polymer may have a glass transition temperature ("$T_g$") of about −50° C. to about 100° C., suitably about −20° C. to about 50° C., or about 20° C. to about 80° C. For example, the $T_g$ of the maintenance layer may be less than about 0° C., less than about −20° C., less than about −30° C., or less than about −40° C. The $T_g$ may be greater than about 0° C., greater than about 20° C., greater than about 40° C., or greater than about 60° C. In those embodiments in which a blend of maintenance layer film formers is used, each film former may have a different $T_g$. In some embodiments of the disclosure, the maintenance layer film former may have more than one glass transition temperature ("$T_g$"). For these embodiments, the maintenance layer film former may have a first $T_g$ from about −50° C. to about 20° C., and a second $T_g$ from about 20° C. to about 120° C. Some embodiments may have a maintenance layer film former with a first $T_g$ from about −50° C. to about −20° C., and a second $T_g$ from about 40° C. to about 100° C. In some embodiments, the first $T_g$ may be from about −40° C. to about −20° C., and the second $T_g$ may be from about 70° C. to about 100° C.

It has been found that some floor finish compositions which are water-borne polyurethane-based compositions exhibit the necessary compatibility and durability properties required for the maintenance layer 150. In general, water-borne polyurethane-based compositions include polyurethane or polyurethane-forming components including but not limited to, self-crosslinking polyurethanes or polyurethane copolymers.

It may be desirable in some cases to repair only a portion of a damaged maintenance layer or surface coating system. To accomplish this, the damaged area can be removed using any suitable technique, such as cutting out using a razor blade or other tool suitable for cutting the layers, and peeling only the cut out section away creating an exposed surface. After removal, the adhesive layer composition can be re-applied to the exposed surface (i.e., the area where the section was removed) to form a repaired adhesive layer. After adhesive layer 130 dries, the maintenance layer composition can then be applied to obtain a repaired coating.

While not wishing to be bound by a particular theory, it is theorized that base coating 250 may provide a surface that is physically and chemically normalized, which is believed to be important for the performance of the coating system. Physically normalized means a surface with nearly equal roughness, porosity, and/or surface morphology as that reached by mechanical and/or chemical methods. Chemically normalized means a surface with nearly equal distribution of chemical moieties such as hydroxyl groups, ester groups, hydrocarbon groups, fluorochemical groups, phosphate groups, organo-phosphate groups, metal and metal oxides and the like as that reached by mechanical and/or chemical methods. Suitably, the surface is substantially free of chemical moieties which would either dramatically increase (too much adhesion) or decrease (too little adhesion) adhesion of adhesive layer 130 and maintenance layer 150.

It should be understood that there may be one or more additional layers between the layers described above. In this manner, the layers may be applied directly or indirectly to one another.

EXAMPLES

The following Examples are provided to assist in further understanding of the invention. The particular materials and methods employed are considered to be illustrative of the invention and are not meant to be limiting on the scope of the claims.

Example 1

Peelable Coatings with Heat-Activated Adhesives and Polyurethane Dispersions Vinyl composite tiles (EXCELON brand, Armstrong Flooring, Lancaster, Pa.) were prepared with various combinations of ADHESIVE LAYER COMPOSITIONS 1-7 and MAINTENANCE LAYER COMPOSITIONS 1-2.

Adhesive Layer Composition 1

| | |
|---|---|
| 75.00 wt % | DISPERCOLL U ® 53 |
| 19.78 wt % | Deionized water |
| 0.2 wt % | TEGO ® FOAMEX 822 |
| 0.02 wt % | CAPSTONE ™ FS-60 |
| 5.00 wt % | Diethylene Glycol Monoethyl Ether |

Adhesive Layer Composition 2

| | |
|---|---|
| 56.25 wt % | DISPERCOLL U ® 53 |
| 18.75 wt % | IMPRANIL ® DLU |
| 21.03 wt % | Deionized water |
| 0.20 wt % | TEGO ® FOAMEX 822 |
| 0.02 wt % | CAPSTONE ™ FS-60 |
| 3.75 wt % | Diethylene Glycol Monoethyl Ether |

Adhesive Layer Composition 3

| | |
|---|---|
| 56.25 wt % | DISPERCOLL U ® 53 |
| 18.75 wt % | IMPRANIL ® XP2611 |
| 21.03 wt % | Deionized water |
| 0.20 wt % | TEGO ® FOAMEX 822 |
| 0.02 wt % | CAPSTONE ™ FS-60 |
| 3.75 wt % | Diethylene Glycol Monoethyl Ether |

Adhesive Layer Composition 4

| | |
|---|---|
| 63.75 wt % | IMPRANIL ® XP2611 |
| 11.25 wt % | IMPRANIL ® DLU |
| 24.78 wt % | Deionized water |
| 0.20 wt % | TEGO ® FOAMEX 822 |
| 0.02 wt % | CAPSTONE ™ FS-60 |

Adhesive Layer Composition 5

| | |
|---|---|
| 75.00 wt % | DISPERCOLL U ® 53 |
| 16.88 wt % | Deionized water |
| 0.2 wt % | TEGO ® FOAMEX 822 |
| 0.02 wt % | CAPSTONE ™ FS-60 |
| 5.00 wt % | Diethylene Glycol Monoethyl Ether |
| 3.0 wt % | Glycerol Monostearate-modified A-C ® 316 NONIONIC WAX EMULSION |

Adhesive Layer Composition 6

| | |
|---|---|
| 75.00 wt % | DISPERCOLL U ® 53 |
| 16.88 wt % | Deionized water |
| 0.2 wt % | TEGO ® FOAMEX 822 |
| 0.02 wt % | CAPSTONE ™ FS-60 |
| 5.00 wt % | Diethylene Glycol Monoethyl Ether |
| 3.0 wt % | A-C ® 316 NONIONIC WAX EMULSION |

Adhesive Layer Composition 7

| | |
|---|---|
| 63.75 wt % | IMPRANIL ® XP2611 |
| 11.25 wt % | IMPRANIL ® DLU |
| 21.78 wt % | Deionized water |
| 0.20 wt % | TEGO ® FOAMEX 822 |
| 0.02 wt % | CAPSTONE ™ FS-60 |
| 3.0 wt % | Glycerol Monostearate-modified A-C ® 316 NONIONIC WAX EMULSION |

Maintenance Layer Composition 1

| | |
|---|---|
| 65.00 wt % | BAYHYDROL ® UH 2606 |
| 25.87 wt % | Deionized water |
| 0.10 wt % | TEGO ® FOAMEX 822 |
| 0.03 wt % | CAPSTONE ™ FS-60 |
| 6.00 wt % | Diethylene glycol monoethyl ether |
| 3.00 wt % | A-C ® 316 NONIONIC WAX EMULSION |

Maintenance Layer Composition 2

| | |
|---|---|
| 85.00 wt % | BAYHYDROL ® UH 2558 |
| 10.09 wt % | Deionized water |
| 0.10 wt % | TEGO ® FOAMEX 822 |
| 0.02 wt % | CAPSTONE ™ FS-60 |
| 4.68 wt % | Dipropylene glycol monoethyl ether |

Example 2

INSTRON™ Testing

The testing was done using a version ASTM D 6862-03 "Standard Test Method for 90 Degree Peel Resistance of Adhesives". The peelable coatings were tested using an INSTRON™ Table Top Electromechanical Single Column Testing System, model 3345 (INSTRON™, Norwood Mass.) using a 90° peeling attachment. The testing was done using a version of ASTM D882-10 "Standard Test Method for Tensile Properties of Thin Plastic Sheeting". The films were tested using an INSTRON™ Table Top Electromechanical Single Column Testing System, model 3345 (INSTRON™, Norwood Mass.).

Vinyl composite tiles (EXCELON brand, Armstrong Flooring, Lancaster, Pa.) were prepared by applying commercially-available floor finish (OVER & UNDER, Diversey, Sturtevant, Wis.) as a base coating at a rate of 2,000 sq.ft/gal, and allowed to dry Next, the peelable layer composition described in Table 1 was applied at a rate of approximately 600 ft$^2$/gal atop the base coating, and allowed to dry.

TABLE 1

Adhesive Layer Composition

| Amount (wt %) | Adhesive Layer Composition Component |
|---|---|
| 19.74 wt % | Deionized water |
| 5.00 wt % | DE Solvent from Dow |
| 0.01 wt % | CAPSTONE ™ FS-60 |
| 75.0 wt % | DISPERCOLL U ® 53 |
| 0.25 wt % | TEGO ® FOAMEX 822 |

Two successive layers of the maintenance composition described in Table 2 were then applied to the adhesive layer at a rate of 600 ft$^2$/gal, with a drying period between successive layers of maintenance layer compositions.

TABLE 2

Maintenance Layer Composition

| Amount (wt %) | Maintenance Layer Composition Component |
|---|---|
| 10.09 wt % | Deionized water |
| 85.00 wt % | BAYHYDROL ® UH 2558 |
| 4.68 wt % | Dipropylene glycol monoethyl ether |
| 0.10 wt % | TEGO ® FOAMEX 822 |
| 0.02 wt % | CAPSTONE ™ FS-60 |

After the coating system had fully cured in air, the tile was cut into 1 inch sections. Free films were placed into the INSTRON™ Testing System for tensile and elongation analysis. The samples were extended at a rate of 30 mm/min to measure the tensile properties. Tiles were placed in the INSTRON™ Testing System utilizing the 90 degree peel apparatus and the samples were peeled at a rate of 1,000 mm/min to measure the peel properties. The software program of the INSTRON™ then automatically calculated the ultimate tensile strength, elongation, and peel strength of the sample. The results are shown in Table 3.

TABLE 3

Properties of Finished Coating (measured at 80% RH, 80° F.)

| Property | Value (units) |
|---|---|
| Ultimate Tensile Strength at Max. load (average load/area) for Peelable Coating | 1320 psi |
| % Elongation at Break for Peelable Coating | 264% |
| Peel Strength (average load/width) for removing Peelable Coating from Surface | 282 gf/25 mm |

Example 3

Alcohol Resistance Testing

The alcohol resistance of the finished coating was evaluated using the method similar to the water spot ASTM D1793-92 Method, substituting water with ethanol, isopropanol, or methanol. Vinyl composite tiles (EXCELON brand, Armstrong Flooring, Lancaster, Pa.) were prepared by applying commercially-available floor finish (OVER & UNDER, Diversey, Sturtevant, Wis.) as a base coating at a rate of 2,000 sq.ft/gal, and allowing the base coating to dry. Next, the peelable layer composition described in Table 4 was applied at a rate of approximately 600 ft$^2$/gal atop the base coating, and allowed to dry. Two successive layers of the maintenance composition described in Table 4 were then applied to the peelable layer at a rate of 600 ft$^2$/gal, with a drying period between successive layers of maintenance layer compositions. The final coated VOC tiles were further dried overnight.

At the conditions of about 50% relative humidity and room temperature (about 20+/−2° C.), 1 mL of alcohol was placed in two spots on the panel. One spot was covered with a plastic cup, while the other spot was left open to air to dry. After 1 hour, the standing alcohol, if any, was carefully wiped off with cheesecloth. The two spots were examined for whitening and blisters. Table 4 shows the results comparing the finish coatings comprising heat-activated polyurethane dispersion adhesive layer and ethylene vinyl acetate (AIRFLEX® EZ123 (Air Products and Chemicals, Inc., Allentown, Pa.)) adhesive layer, respectively. As shown in Table 4, the finished coating including the heat-activated polyurethane dispersion adhesive layer showed no whitening and no blisters, while the finished coating with AIRFLEX® EZ123 adhesive layer was whitened and showed blisters with alcohol spotting after 1 hour. The results indicated that the finished coating with heated-activated polyurethane showed alcohol resistance.

TABLE 4

Alcohol Resistance of Finished Coatings (measured at 80% RH, 80° F.)

| Ingredient | Active wt % | Sample 1 | Sample 2 |
|---|---|---|---|
| | | Maintenance Layer | Maintenance Layer |
| BAYHYDROL ® UH2606 | 40 | 65.00 | 65.00 |
| Deionized water | 0 | 28.87 | 28.87 |
| TEGO ® FOAMEX 822 | 26 | 0.10 | 0.10 |
| CAPSTONE ™ FS-60 | 40 | 0.03 | 0.03 |
| Diethylene glycol monoethyl ether | 100 | 6.00 | 6.00 |
| Total | | 100.00 | 100.00 |
| | | Adhesive Layer | Adhesive Layer |
| DISPERCOLL U ® 53 | 40 | 56.25 | |
| IMPRANIL ® DLU | 60 | 18.75 | |
| AIRFLEX ® EZ123 Emulsion | 54 | | 84 |
| Deionized water | 0 | 21.03 | 14 |
| TEGO ® FOAMEX 822 | 26 | 0.2 | 0.03 |
| CAPSTONE ™ FS-60 | 40 | 0.02 | 0.02 |
| Diethylene glycol monoethyl ether | 100 | 3.75 | 1.75 |
| Ammonium hydroxide | 28 | | 0.2 |
| Total | | 100.00 | 100.00 |
| Alcohol Resistance Ethanol 60 minutes open | | | |
| whitening | | No | Yes |
| blisters | | No | Yes |
| 60 minutes covered | | | |
| whitening | | No | Yes |
| blisters | | No | Yes |

What is claimed is:
1. A coating system comprising:
    a) a liquid adhesive layer composition comprising a heat-activated adhesive, wherein when the adhesive layer composition is applied on top of a surface, the adhesive layer composition dries to form an adhesive layer adhered to the surface, the heat-activated adhesive resulting in a tack-free surface upon drying; and b) a liquid maintenance layer composition comprising a dispersible polymer, wherein when the maintenance layer composition is applied on top of the adhesive layer, the maintenance layer composition dries to form a maintenance layer adhered to the adhesive layer, wherein the adhesive layer and maintenance layer form a peelable coating, wherein an adhesive strength between the adhesive layer and the maintenance layer is greater than an adhesive strength between the adhesive layer and the surface, and wherein the peelable coating has a tensile strength that is greater than the adhesive strength between the adhesive layer and the surface, such that the peelable coating is configured to be peeled from the surface without the adhesive layer and the maintenance layer separating from one another.

2. The coating system of claim 1, wherein the maintenance layer composition comprises a polyurethane.

3. The coating system of claim 1, wherein the adhesive layer composition or the maintenance layer composition further comprises a wax emulsion.

4. The coating system of claim 3, wherein the wax emulsion comprises oxidized polyethylene and glycerol monostearate.

5. The coating system of claim 1, wherein the adhesive layer composition comprises a polyurethane.

6. The coating system of claim 1, wherein the adhesive layer composition comprises a first polyurethane composition, a second polyurethane composition, or a combination thereof.

7. The coating system of claim 6, wherein the first polyurethane composition comprises a heat-activated polyurethane.

8. The coating system of claim 6, wherein the second polyurethane composition comprises a polyether, a polyester, a polycarbonate, or a combination thereof.

9. The coating system of claim 1, wherein the peelable coating does not whiten and/or blister after exposure to an alcohol for about 30 minutes, wherein the alcohol comprises at least one of methanol, ethanol, and isopropanol.

10. The coating system of claim 1, wherein the peelable coating comprises a peel strength of between about 50 gf/25 mm from the surface and about 500 gf/25 mm from the surface.

11. A method of coating a surface comprising:
a) applying a liquid adhesive layer composition comprising an emulsified heat-activated adhesive on top of a surface;
b) drying the adhesive layer composition to form an adhesive layer adhered to the surface, the heat-activated adhesive resulting in a tack-free surface upon drying;
c) applying a maintenance layer composition comprising an emulsified dispersible polymer on top of the adhesive layer; and
d) drying the maintenance layer composition to form a maintenance layer adhered to the adhesive layer, wherein the adhesive layer and maintenance layer form a peelable coating, wherein an adhesive strength between the adhesive layer and the maintenance layer is greater than an adhesive strength between the adhesive layer and the surface, and wherein the peelable coating has a tensile strength that is greater than the adhesive strength between the adhesive layer and the surface, such that the peelable coating is configured to be peeled from the surface without the adhesive layer and the maintenance layer separating from one another.

12. The method of claim 11, wherein the maintenance layer composition comprises a polyurethane.

13. The method of claim 11, wherein the adhesive layer composition or the maintenance layer composition further comprises a wax emulsion.

14. The method of claim 13, wherein the wax emulsion comprises a non-ionic wax emulsion.

15. The method of claim 11, wherein the heat-activated adhesive comprises a polyurethane.

16. The method of claim 11, wherein the adhesive layer composition comprises a first polyurethane composition, a second polyurethane composition, or a combination thereof.

17. The method of claim 16, wherein the first polyurethane composition comprises heat-activated polyurethane.

18. The method of claim 16, wherein the second polyurethane composition comprises a polyether, a polyester, a polycarbonate, or a combination thereof.

19. The method of claim 11, wherein the peelable coating does not whiten and/or blister after exposure to an alcohol for about 30 minutes, wherein the alcohol comprises at least one of methanol, ethanol, and isopropanol.

20. The method of claim 11, wherein the peelable coating comprises a peel strength of between about 50 gf/25 mm from the surface and about 500 gf/25 mm from the surface.

* * * * *